(12) United States Patent     (10) Patent No.:   US 12,593,024 B2

Kitahara et al.     (45) Date of Patent:    Mar. 31, 2026

---

(54) HEAD-UP DISPLAY DEVICE

(71) Applicant: YAZAKI CORPORATION, Tokyo (JP)

(72) Inventors: Hiroki Kitahara, Susono (JP); Naohisa Murata, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 73 days.

(21) Appl. No.: 18/755,595

(22) Filed: Jun. 26, 2024

(65) Prior Publication Data

US 2025/0024013 A1    Jan. 16, 2025

(30) Foreign Application Priority Data

Jul. 13, 2023   (JP) ................................. 2023-114937

(51) Int. Cl.

| | |
|---|---|
| *H04N 13/398* | (2018.01) |
| *H04N 13/111* | (2018.01) |
| *H04N 13/156* | (2018.01) |
| *H04N 13/302* | (2018.01) |

(52) U.S. Cl.
CPC ......... *H04N 13/398* (2018.05); *H04N 13/111* (2018.05); *H04N 13/156* (2018.05); *H04N 13/302* (2018.05)

(58) Field of Classification Search
CPC .. H04N 13/398; H04N 13/332; H04N 13/383; H04N 5/64; H04N 13/344; G02B 30/26; G02B 27/0093; G02B 27/02; G02B 30/20; G02B 30/22; G09G 3/20; G09G 5/36

USPC .......................................................... 348/53
See application file for complete search history.

(56) References Cited

U.S. PATENT DOCUMENTS

| | | | | |
|---|---|---|---|---|
| 10,234,685 | B2 * | 3/2019 | Yamasaki | .......... G02B 27/0101 |
| 11,715,397 | B2 * | 8/2023 | Iwasaki | .................... G06T 5/70 |
| | | | | 345/633 |
| 2019/0212553 | A1 | 7/2019 | Kaneko et al. | |
| 2019/0258057 | A1 * | 8/2019 | Hada | .................. G02B 27/0101 |
| 2019/0265468 | A1 * | 8/2019 | Hirata | .................. B60K 35/215 |

(Continued)

FOREIGN PATENT DOCUMENTS

| | | | |
|---|---|---|---|
| JP | 2005-156678 | A | 6/2005 |
| JP | 2021-110904 | A | 8/2021 |

(Continued)

*Primary Examiner* — Tung T Vo

(74) *Attorney, Agent, or Firm* — KENEALY VAIDYA LLP

(57) ABSTRACT

In a head-up display device, a transparent cover is arranged at an opening in such a manner that, as display light emitted by a display device and incident on the transparent cover is closer to an eye point, an incident angle of the display light incident on the transparent cover is greater. A display region on a windshield is divided into a lower divided region and an upper divided region differing from the lower divided region and disposed above the lower divided region in a vertical direction. A display controller performs blurring processing of displaying at least an upper side of a design image in a blurred manner when the design image displayed by the display light is displayed in the upper divided region by controlling the display device, and does not perform the blurring processing when a design image is displayed in the lower divided region.

10 Claims, 5 Drawing Sheets

(56)     References Cited

U.S. PATENT DOCUMENTS

| | | | | |
|---|---|---|---|---|
| 2019/0265582 A1* | 8/2019 | Sakai | .................... | G02B 5/10 |
| 2019/0329716 A1* | 10/2019 | Kubota | ................ | B60K 35/53 |
| 2020/0201037 A1* | 6/2020 | Yamamoto | ............ | B60K 35/00 |
| 2020/0298704 A1* | 9/2020 | Hirata | ............... | G02B 27/0101 |
| 2020/0353816 A1* | 11/2020 | Hirata | ................... | G06F 3/013 |
| 2021/0271078 A1 | 9/2021 | Watanabe et al. | | |
| 2022/0155589 A1* | 5/2022 | Hirata | .............. | G02B 27/0101 |

FOREIGN PATENT DOCUMENTS

| | | | |
|---|---|---|---|
| KR | 10-2023-0014970 A | 1/2023 | |
| WO | 2018/056111 A1 | 3/2018 | |
| WO | 2020/013160 A1 | 1/2020 | |

* cited by examiner

DISPLAY CONTROLLER

HEAD-UP DISPLAY DEVICE

CROSS-REFERENCE TO RELATED APPLICATION(S)

The present application claims priority to and incorporates by reference the entire contents of Japanese Patent Application No. 2023-114937 filed in Japan on Jul. 13, 2023.

BACKGROUND OF THE INVENTION

1. Field of the Invention

The present invention relates to head-up display devices.

2. Description of the Related Art

As a conventional art, for example, Japanese Patent Application Laid-open No. 2005-156678 discloses a head-up display device using a combiner. This head-up display device includes light-emission display means generating information to be displayed as display light and a combiner disposed on a windshield surface of a vehicle and reflecting the display light toward the driver inside the vehicle. This combiner is formed to have a wedge-shaped section and is disposed on the vehicle interior side of the windshield surface while the side closer to the light-emission display means is thinner than the remoter side. This configuration allows the head-up display device to prevent a double image in which a display image projected with the display light reflected by the combiner overlaps with a display image projected with display light reflected off the exterior surface of the windshield.

It can be conceived that the head-up display device disclosed in Japanese Patent Application Laid-open No. 2005-156678, for example, accommodates the light-emission display means in a housing and emits the display light from the light-emission display means toward the windshield via an opening of the housing. In this case, the housing is provided with a transparent cover closing the opening to prevent dust and the like from entering the housing from the opening. In the head-up display device, this transparent cover has a thickness, so that the display light emitted from the light-emission display means may be reflected inside the transparent cover, and this reflected light may be visible as a double image.

SUMMARY OF THE INVENTION

In light of the foregoing, an object of the present invention is to provide a head-up display device that can properly display a virtual image.

In order to achieve the above mentioned object, a head-up display device according to one aspect of the present invention includes a display unit disposed in a vehicle and configured to reflect display light reflected off a reflecting member toward an eye point side to display a virtual image in a display region on the reflecting member, the display light being emitted toward the reflecting member, the reflecting member being capable of transmitting light; a housing equipped with the display unit and including an opening disposed facing the reflecting member, the housing being configured to allow the display light to pass through the opening, the display light traveling from the display unit to the reflecting member; a transparent cover configured to close the opening and to transmit the display light traveling to the reflecting member; and a display controller configured to control the display unit, wherein the display unit includes a display device accommodated inside the housing and configured to be controlled by the display controller to emit the display light, the transparent cover is arranged at the opening in such a manner that, as the display light emitted by the display device and incident on the transparent cover is closer to the eye point, an incident angle of the display light incident on the transparent cover is greater, the display region is divided into a first divided region and a second divided region differing from the first divided region, the second divided region being disposed above the first divided region in a vertical direction, and when displaying a design image displayed by the display light in the second divided region by controlling the display device, the display controller is configured to perform blurring processing of displaying at least an upper side of the design image in the vertical direction in a blurred manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for implementing the present invention (embodiment) will be described in detail with reference to the drawings. Contents described in the following embodiment should not be construed to limit the present invention. Constituents described below include those that can be readily conceived by those skilled in the art and that are substantially the same. Configurations described below can be combined as appropriate. Various omissions, substitutions, or modifications of the configurations can be made without departing from the gist of the present invention.

A head-up display device 1 according to an embodiment will be described with reference to the drawings. The head-up display device 1 is disposed in a vehicle and reflects display light L emitted toward a windshield W that can transmit light off the windshield W toward an eye point EP side to display a virtual image S in a display region E on the windshield W. Herein, the eye point EP is a preliminarily assumed position as the position of the eyes of a driver D or an actual position of the eyes of the driver D. The windshield W is an example reflecting member and is a member formed from transparent glass to have a plate shape. The windshield W is disposed in front of a driver's seat where the driver D is seated and blocks the wind. The head-up display device 1 is an AR-HUD device that displays the virtual image S on an object OJ (for example, a person, a sign, another vehicle, or the like) in front of the vehicle in a superimposed manner while causing the virtual image S to follow the object OJ. The head-up display device 1 will be described in detail below.

Figure 1:
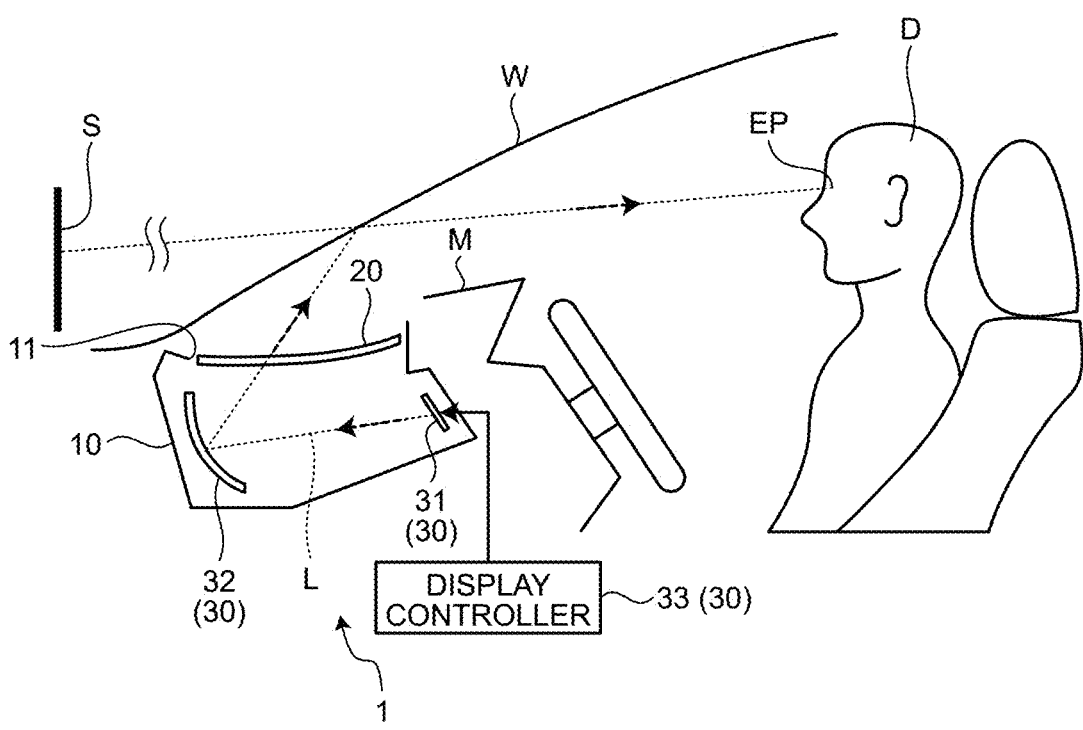
FIG. 1 is a schematic view illustrating an example configuration of a head-up display device according to an embodiment.

As illustrated in FIG. 1, the head-up display device 1 includes a housing 10, a transparent cover 20, and a display unit 30.

The housing 10 is disposed in an instrument panel M of the vehicle and is equipped with the display unit 30. The housing 10 is formed to have a box shape and accommodates the display unit 30 inside the housing 10. The housing 10 includes an opening 11 connecting the interior to the exterior. The opening 11 is disposed facing the windshield W and can allow light to pass therethrough. The housing 10 allows the display light L traveling from the display unit 30 to the windshield W to pass through the opening 11.

Figure 2:
FIG. 2 is a diagram illustrating regular light and non-regular light according to the embodiment.
Figure 2:
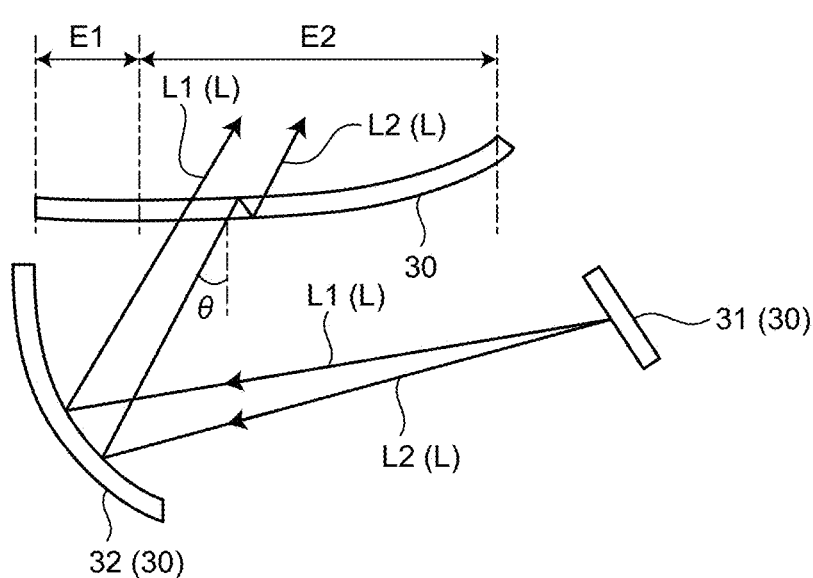

The transparent cover 20 closes the opening 11 of the housing 10 and prevents dust and the like from entering the housing 10. The transparent cover 20 is formed from transparent resin to have a curved plate shape and is, for example, formed to be curved toward the interior of the housing 10. The transparent cover 20 transmits the display light L traveling from the display unit 30 to the windshield W while closing the opening 11. Herein, the transparent cover 20 is arranged at the opening 11 in such a positional relationship as to prevent outside light (sunlight) from being reflected toward the eye point EP side. For example, as illustrated in FIG. 2, the transparent cover 20 is arranged at the opening 11 in such a manner that, as the display light L emitted by a display device 31 and incident on the inner surface of the transparent cover 20 is closer to the eye point EP, an incident angle θ of the display light L incident on the inner surface of the transparent cover 20 is greater. In other words, the display light L incident on the inner surface of the transparent cover 20 has an incident angle θ that is greater as the display light L is closer to the eye point EP.

The display unit 30 displays the virtual image S in the display region E on the windshield W. The display unit 30 includes the display device 31, a magnifying mirror 32, and a display controller 33. Note that the display controller 33 may be disposed at the display unit 30 itself or, for example, outside the housing 10.

The display device 31 is accommodated inside the housing 10 and emits the display light L. The display device 31 includes a liquid crystal panel and a backlight. The liquid crystal panel is composed of, for example, a thin film transistor-liquid crystal display (TFT-LCD) or the like and forms a design image P (see FIG. 3) indicating a desired design (for example, a vehicle-related design, such as a speed, mark, symbol, and figure). The backlight illuminates the back surface of the liquid crystal panel with light and is composed of, for example, a plurality of light-emitting diodes (LEDs) or the like. The display device 31 is connected to the display controller 33 and operates the liquid crystal panel and the backlight on the basis of a control signal output from the display controller 33. The display device 31, for example, forms the design image P on the liquid crystal panel and illuminates the liquid crystal panel with light from the backlight on the basis of the control signal output from the display controller 33, thereby emitting the display light L (light for displaying the design image P) from the liquid crystal panel toward the magnifying mirror 32.

The magnifying mirror 32 totally reflects light and is accommodated inside the housing 10. The magnifying mirror 32 includes a concave and aspherically formed reflective surface. The reflective surface is disposed facing the display device 31 and facing the windshield W. The magnifying mirror 32 magnifies the display light L (design image P) emitted from the display device 31 using the reflective surface and reflects the magnified display light L toward the windshield W via the transparent cover 20 disposed at the opening 11 of the housing 10.

The display controller 33 controls the display device 31. The display controller 33 outputs the control signal to the display device 31 to operate the liquid crystal panel and the backlight of the display device 31. The display controller 33, for example, outputs the control signal to the display device 31 to form the design image P on the liquid crystal panel and to illuminate the liquid crystal panel on which the design image P is formed, with light from the backlight, and emits the display light L from the liquid crystal panel toward the windshield W.

Herein, the display light L reflected off the magnifying mirror 32 is transmitted through the transparent cover 20 and reflected off the windshield W toward the eye point EP side. In this case, for example, as illustrated in FIG. 2, the display light L includes regular light L1 transmitted without reflected inside the transparent cover 20 and non-regular light L2 transmitted after reflected inside the transparent cover 20. The non-regular light L2 is light visible as a double image because the display light L emitted from the display device 31 is reflected inside the transparent cover 20 because the transparent cover 20 has a thickness and this reflected display light L reaches the eye point EP while being shifted from the regular light L1.

Figure 4:
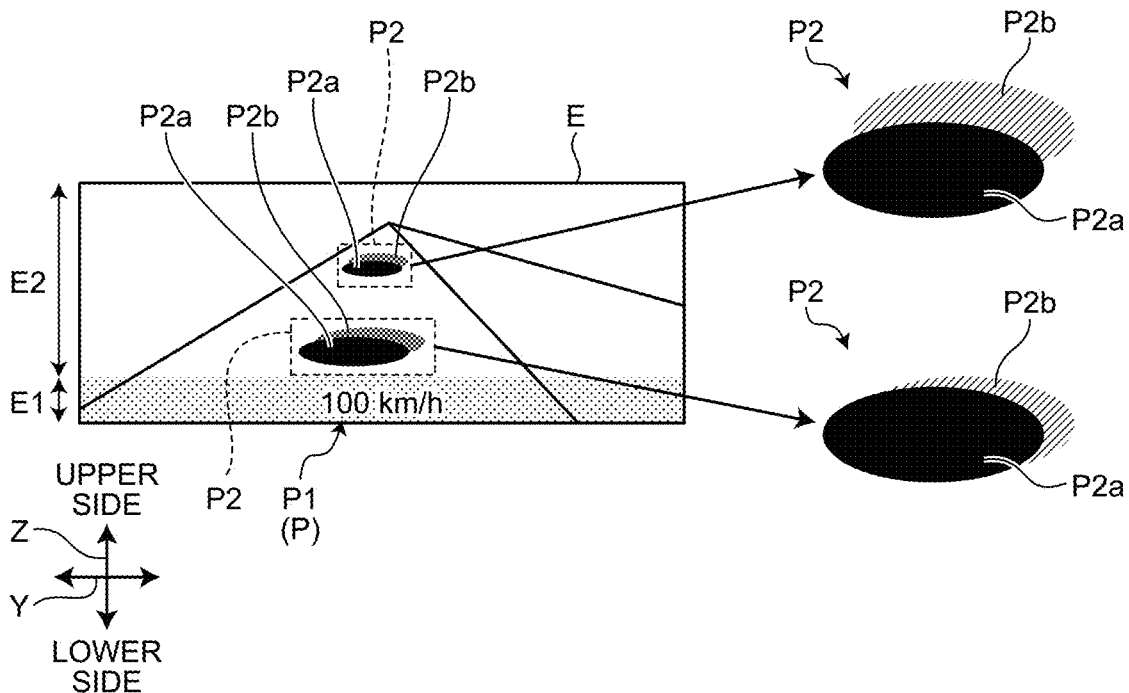
FIG. 4 is a diagram illustrating example display of double images according to a comparative example.

As described above, the transparent cover 20 is arranged at the opening 11 in such a positional relationship as to prevent outside light (sunlight) from being reflected toward the eye point EP side. To be specific, the transparent cover 20 is arranged at the opening 11 in such a manner that, as the non-regular light L2 incident on the inner surface of the transparent cover 20 is closer to the eye point EP, the incident angle θ of the display light L incident on the inner surface of the transparent cover 20 is greater. That is, the non-regular light L2 is easily visible as a double image because the non-regular light L2 incident on the inner surface of the transparent cover 20 has an incident angle θ that is greater as the non-regular light L2 is closer to the eye point EP and a greater incident angle θ increases the reflectance, which reduces a drop in the luminance (reduces light attenuation). In other words, if the incident angle θ of the non-regular light L2 is relatively great, that is, if the design image P (virtual image S) is positioned on an upper side in a vertical direction Z in the display region E on the windshield W, the non-regular light L2 is easily visible as a double image. On the other hand, if the incident angle θ of the non-regular light L2 is relatively small, that is, if the design image P (virtual image S) is positioned on a lower side in the vertical direction Z in the display region E on the windshield W, the non-regular light L2 is difficult to be visible as a double image. For example, as illustrated in FIG. 4, regarding design images P2b displayed by the non-regular light L2, the design image P2b displayed on the upper side in the vertical direction z in the display region E is seen more noticeably as a double image than the design image P2*b* displayed on the lower side in the vertical direction Z in the display region E. FIG. 4 is a diagram illustrating example display of double images according to a comparative example. Note that design images P2*a* illustrated in FIG. 4 are images displayed by the regular light L1. If positioned on the upper side in the vertical direction Z in the display region E, the design image P (virtual image S) is easily visible as a double image, so that the display controller 33 performs blurring processing being processing of blurring the design image P. On the other hand, if positioned on the lower side in the vertical direction z in the display region E, the design image P (virtual image S) is difficult to be visible as a double image, so that the display controller 33 does not perform the blurring processing.

Figure 3:
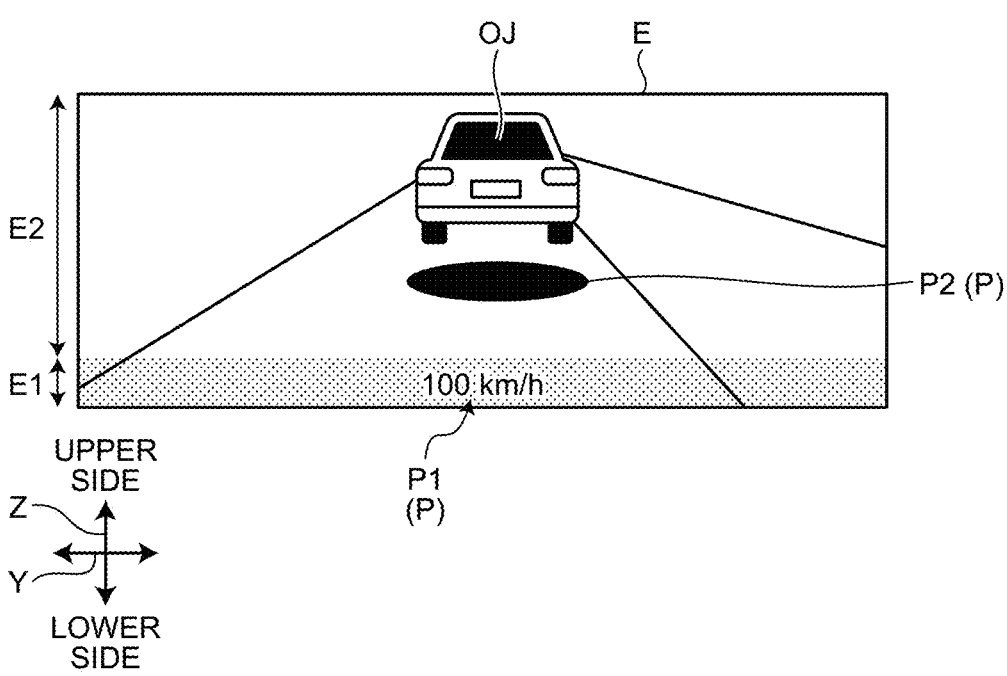
FIG. 3 is a diagram illustrating example display of design images according to the embodiment.

The display region E is divided into a region where the blurring processing is performed and a region where the blurring processing is not performed. For example, as illustrated in FIG. 3, the display region E is formed to have a rectangular shape. The rectangular display region E is divided into two in a vehicle width direction Y along the width of the vehicle, and is divided into, for example, a lower divided region E1 as a first divided region and an upper divided region E2 as a second divided region. That is, the rectangular display region E is divided into two by a division line in the vehicle width direction Y and is provided with the lower divided region E1 on the lower side in the vertical direction Z orthogonal to the vehicle width direction Y and with the upper divided region E2 on the upper side in the vertical direction Z.

The lower divided region E1 is a region where the blurring processing is not performed. The lower divided region E1 is formed to have a rectangular shape and is a region on the lower side in the vertical direction Z in the display region E. The lower divided region E1 is formed smaller than the upper divided region E2. To be specific, the lower divided region E1 is formed so that the length of the lower divided region E1 in the vehicle width direction Y is the same as that of the upper divided region E2 and that the length of the lower divided region E1 in the vertical direction Z is shorter than that of the upper divided region E2. The lower divided region E1 displays a design image P1 that is not subjected to the blurring processing described later.

The upper divided region E2 is a region where the blurring processing is performed. The upper divided region E2 is formed to have a rectangular shape and is a region that differs from the lower divided region E1 in the display region E and that is disposed above the lower divided region E1 in the vertical direction Z. The upper divided region E2 is formed larger than the lower divided region E1. To be specific, the upper divided region E2 is formed so that the length of the upper divided region E2 in the vehicle width direction Y is the same as that of the lower divided region E1 and that the length of the upper divided region E2 in the vertical direction Z is longer than that of the lower divided region E1. The upper divided region E2 displays a design image P2 that is subjected to the blurring processing.

Figure 5:
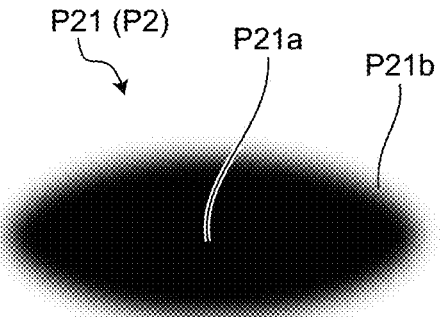
FIG. 5 is a diagram illustrating example display of a design image after blurring processing according to the embodiment.
Figure 6:
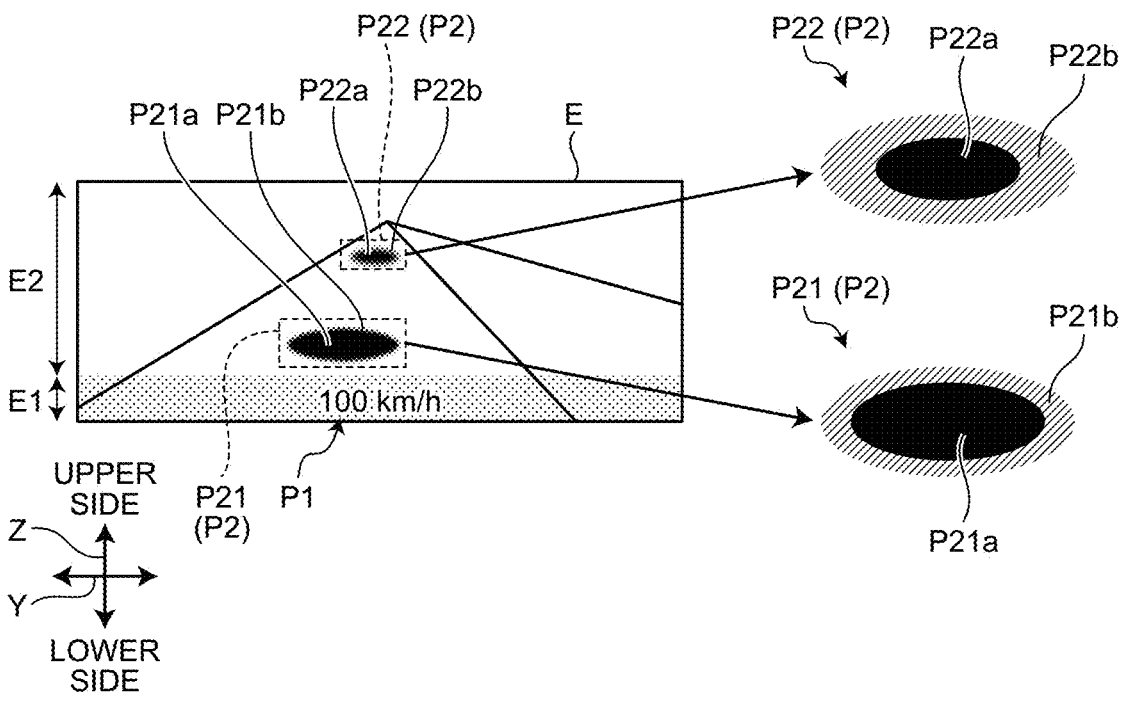
FIG. 6 is a diagram illustrating example display of design images according to the embodiment.

If displayed in the upper divided region E2, the design image P2 displayed by the display light L is easily visible as a double image as described above, so that the display controller 33 performs the blurring processing of displaying at least an upper side of the design image P2 in the vertical direction Z in a blurred manner. For example, as illustrated in FIG. 5, the display controller 33 forms a blurred region P21*b* (P22*b*) on the contour of the oval design image P2. To be specific, if the total number of pixels of the design image P2 is 100, the display controller 33 does not perform the blurring processing to a central region P21*a* (80 pixels in the center) of the design image P2 and, in a peripheral region (81 pixels to 100 pixels) positioned on the periphery of the central region P21*a* of the design image P2, forms the blurred region P21*b* (P22*b*) in which gradations (shading) are formed by gradually decreasing the luminance and RGB values from the central region P21*a* toward the contour. At this time, as illustrated in FIG. 6, the display controller 33 increases the proportion of the blurred region P22*b* in a design image P22 displayed on an upper side in the vertical direction z in the upper divided region E2 in comparison to the proportion of the blurred region P21*b* in a design image P21 displayed on a lower side in the vertical direction z in the upper divided region E2. In this way, when the design image P22 is displayed on the upper side in the vertical direction Z in the upper divided region E2, a double image is seen more noticeably, so that, in this case, a display controller 13 relatively increases the proportion of the blurred region P22*b* in the design image P22, thereby further preventing a double image from being visible. When the design image P2 after the blurring processing is displayed in the upper divided region E2, the display controller 33 displays the design image P2 on the object OJ (for example, a vehicle in front) in front of the vehicle contained in the upper divided region E2 in a superimposed manner while causing the design image P2 to follow the object OJ.

If displayed in the lower divided region E1, the design image P1 displayed by the display light L is difficult to be visible as a double image as described above, so that the display controller 33 does not perform the blurring processing. For example, as illustrated in FIG. 6, if displayed in the lower divided region E1, the design image P1 indicating a speed (100 km/h) is difficult to be visible as a double image as described above, so that the display controller 33 does not perform the blurring processing. When the design image P1 is displayed in the lower divided region E1, the display controller 33 displays the design image P1 in a superimposed manner without causing the design image P1 to follow the object OJ in front of the vehicle contained in the lower divided region E1.

Figure 7:
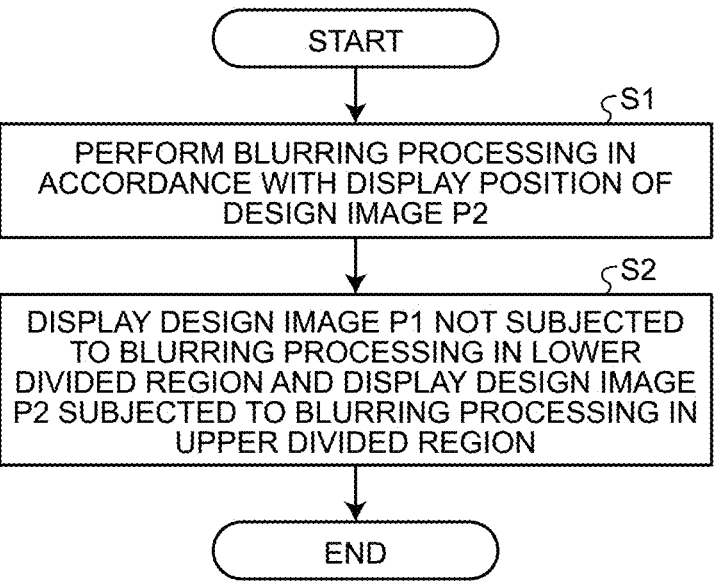
FIG. 7 is a flowchart illustrating example operation of the head-up display device according to the embodiment.

Next, example operation of the head-up display device 1 will be described with reference to FIG. 7. As illustrated in FIG. 7, the head-up display device 1 performs the blurring processing in accordance with the display position of the design image P2 (Step S1). For example, if the design image P22 is displayed on the upper side in the vertical direction Z in the upper divided region E2, the display controller 33 sets a greater proportion of the blurred region P22*b* in the design image P22 than in a case where the design image P21 is displayed on the lower side in the vertical direction Z in the upper divided region E2. Then, the display controller 33 displays the design image P1 not subjected to the blurring processing in the lower divided region E1 and displays the design image P2 subjected to the blurring processing in the upper divided region E2 (Step S2). In this case, when the design image P2 after the blurring processing is displayed in the upper divided region E2, the display controller 33 displays the design image P2 on the object OJ (for example, a vehicle in front) in front of the vehicle contained in the upper divided region E2 in a superimposed manner while causing the design image P2 to follow the object OJ. On the other hand, when the design image P1 not subjected to the blurring processing is displayed in the lower divided region E1, the display controller 33 displays the design image P1 in a superimposed manner without causing the design image P1 to follow the object OJ in front of the vehicle contained in the lower divided region E1.

As described above, the head-up display device 1 according to the embodiment includes the display unit 30, the housing 10, and the transparent cover 20. The display unit 30 is disposed in the vehicle and reflects the display light L emitted toward the windshield W that can transmit light off the windshield W toward the eye point EP side to display the virtual image S in the display region E on the windshield W. The housing 10 is equipped with the display unit 30, includes the opening 11 disposed facing the windshield W, and allows the display light L traveling from the display unit 30 to the windshield W to pass through the opening 11. The transparent cover 20 closes the opening 11 of the housing 10 and transmits the display light L traveling to the windshield W. The display unit 30 includes the display device 31 accommodated inside the housing 10 and emitting the display light L and the display controller 33 controlling the display device 31. The transparent cover 20 is arranged at the opening 11 in such a manner that, as the display light L emitted by the display device 31 and incident on the transparent cover 20 is closer to the eye point EP, the incident angle θ of the display light L incident on the transparent cover 20 is greater. The display region E is divided into the lower divided region E1 and the upper divided region E2 differing from the lower divided region E1 and disposed above the lower divided region E1 in the vertical direction Z. The display controller 33 performs the blurring processing of displaying at least the upper side of the design image P2 in the vertical direction Z in a blurred manner when the design image P2 displayed by the display light L is displayed in the upper divided region E2 by controlling the display device 31, and does not perform the blurring processing when the design image P1 is displayed in the lower divided region E1 by controlling the display device 31.

In the head-up display device 1, the transparent cover 20 is arranged to prevent outside light from being reflected toward the eye point EP side, and this arrangement causes a double image to be easily seen on the upper side in the vertical direction Z in the display region E. The head-up display device 1 does not perform the blurring processing to the design image P1 in the lower divided region E1 on the lower side in the vertical direction Z, where a double image is difficult to be seen, and performs the blurring processing to the design image P2 in the upper divided region E2 on the upper side in the vertical direction Z, where a double image is easily seen. This enables the head-up display device 1 to prevent visibility as a double image. Furthermore, for example, the head-up display device 1 can display information requiring high visibility, such as characters and numerals, in the lower divided region E1, where the blurring processing is not performed, and, on the other hand, can display information that does not require high visibility comparatively, such as figures, in the upper divided region E2, where the blurring processing is performed. This enables the head-up display device 1 to perform display in accordance with visibility of information while preventing a double image. Furthermore, the head-up display device 1 can reduce manufacturing costs in comparison to conventional double image measures using antireflective films or antireflective coating for the transparent cover 20. Thus, the head-up display device 1 according to this embodiment can properly display the virtual image S.

In the above-described head-up display device 1, when performing the blurring processing, the display controller 33 increases the proportion of the blurred region P22b in the design image P22 displayed on the upper side in the vertical direction Z in the upper divided region E2 in comparison to the proportion of the blurred region P21b in the design image P21 displayed on the lower side in the vertical direction Z in the upper divided region E2. This enables the head-up display device 1 to further prevent a double image from being visible by increasing the proportion of the blurred region P22b in the design image P22 on the upper side in the upper divided region E2, where a double image is more noticeably seen, in comparison to the lower side in the upper divided region E2.

In the above-described head-up display device 1, when performing the blurring processing, the display controller 33 forms the blurred region P21b (P22b) on the contour of the design image P2, so that the blurring processing can be performed to a portion including the upper side in the vertical direction Z in the design image P2, where a double image is easily seen.

In the above-described head-up display device 1, the display controller 33 displays the design image P1 in a superimposed manner without causing the design image P1 to follow the object OJ in front of the vehicle contained in the lower divided region E1 when the design image P1 is displayed in the lower divided region E1, and displays the design image P2 on the object OJ in front of the vehicle contained in the upper divided region E2 in a superimposed manner while causing the design image P2 to follow the object OJ when the design image P2 is displayed in the upper divided region E2. This enables the head-up display device 1 to display information requiring high visibility, such as characters and numerals, in the lower divided region E1, where the blurring processing is not performed, without causing the information to follow the object OJ, and, on the other hand, display information that does not require high visibility comparatively, such as figures, in the upper divided region E2, where the blurring processing is performed, while causing the information to follow the object OJ.

Note that the above-described head-up display device 1 according to the embodiment of the present invention is not limited to the above-described embodiment, and various modifications can be made within the scope of the claims.

Figure 8:
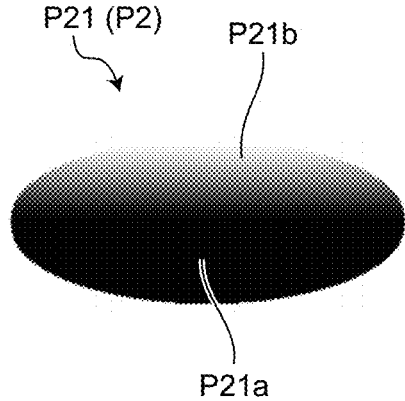
FIG. 8 is a diagram illustrating example display of a design image after the blurring processing according to a modification of the embodiment.
Figure 9:
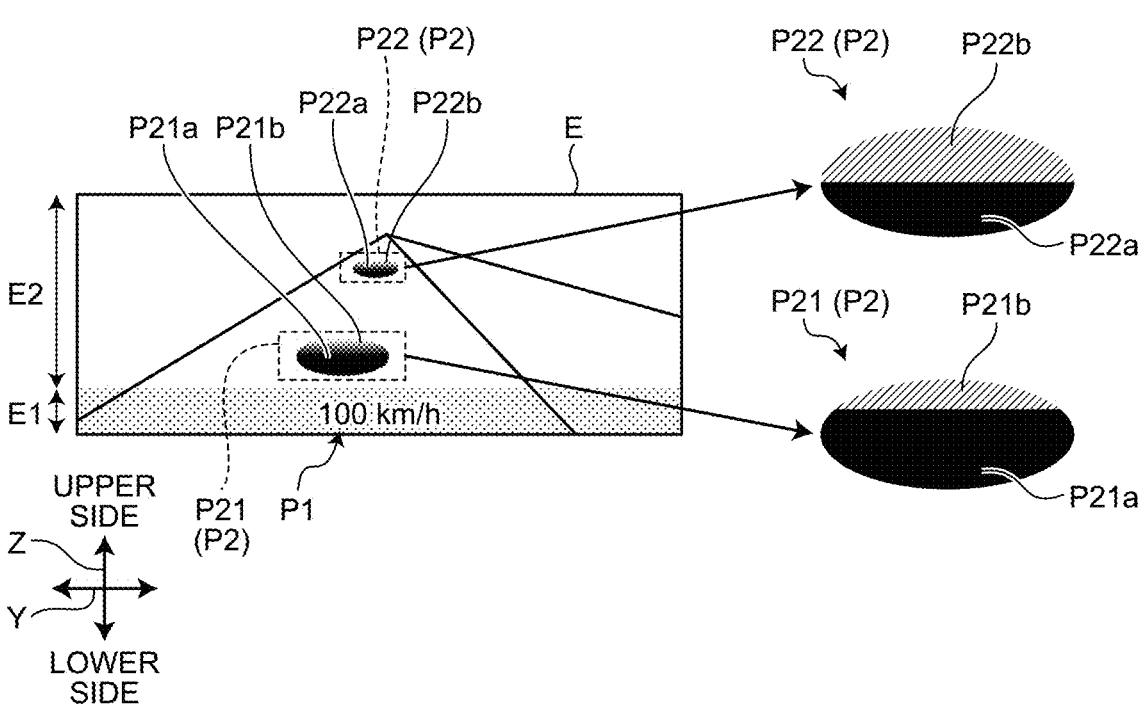
FIG. 9 is a diagram illustrating example display of design images according to the modification of the embodiment.

For example, as illustrated in FIG. 8, the display controller 33 may increase a blurred region P21b (P22b) for an upper region of an oval design image P2 in the vertical direction Z in comparison to a lower region in the vertical direction Z. To be specific, if the number of pixels of the design image P2 in the vertical direction Z is 100, the display controller 33 does not perform the blurring processing to 80 pixels from the lower end toward the upper end of the design image P2 in the vertical direction Z and, from 81 pixels to 100 pixels from the lower end toward the upper end of the design image P2 in the vertical direction Z, forms the blurred region P21b (P22b) in which gradations (shading) are formed by gradually decreasing the luminance and RGB values from the lower end toward the upper end. At this time, as illustrated in FIG. 9, the display controller 33 increases the proportion of the blurred region P22b in a design image P22 displayed on an upper side in the vertical direction Z in the upper divided region E2 in comparison to the proportion of the blurred region P21b in a design image P21 displayed on a lower side in the vertical direction Z in the upper divided region E2. In this way, when the design image P22 is displayed on the upper side in the vertical direction Z in the upper divided region E2, a double image is seen more noticeably, so that in this case, the display controller 13 relatively increases the proportion of the blurred region P22b in the design image P22, thereby further preventing a double image from being visible. When the design image P2 after the blurring processing is displayed in the upper divided region E2, the display controller 33 displays the design image P2 on the object OJ (for example, a vehicle in front) in front of the vehicle contained in the upper divided region E2 in a superimposed manner while causing the design image P2 to follow the object OJ.

Note that, in the above-described example, the head-up display device 1 is an AR-HUD device that displays the design image P2 on the object OJ in front of the vehicle in superimposed manner while causing the design image P2 to follow the object OJ; however, no such limitation is intended, and the head-up display device 1 may be, for example, a HUD device that displays the design image P2 in a superimposed manner without causing the design image P2 to follow the object OJ in front of the vehicle.

In the description, the head-up display device 1 performs the processing of blurring the contour of the design image P2 and the processing of increasing the blurred region on the upper side of the design image P2 in comparison to the lower side as the blurring processing of blurring at least the upper side of the design image P2 in the vertical direction Z; however, no such limitation is intended, and another blurring processing may be performed.

In the above-described example, the head-up display device 1 increases the proportion of the blurred region P22b in the design image P22 displayed on the upper side in the upper divided region E2 in comparison to the proportion of the blurred region P21b in the design image P21 displayed on the lower side in the upper divided region E2; however, no such limitation is intended, and, for example, the proportions of the blurred regions in the design images P21, P22 in the upper divided region E2 may be equal.

In the above-described example, the reflecting member is the windshield W; however, no such limitation is intended, and the reflecting member may be, for example, a combiner. The combiner is a reflecting member composed of a half mirror, for example, and is disposed in the instrument panel M. The combiner transmits light incident from the back surface side and reflects light incident from the front surface side (display light L emitted from the display unit 30).

In the above description, the lower divided region (first divided region) E1 is a region where the blurring processing is not performed; however, no such limitation is intended. That is, in the above description, when the design image P1 displayed by the display light L is displayed in the lower divided region E1, the display controller 33 does not perform the blurring processing; however, no such limitation is intended, and, for example, various pieces of known processing relating to blurring, such as anti-aliasing, may be performed.

In the head-up display device according to the present embodiment, the transparent cover is arranged to prevent outside light from being reflected toward the eye point side, and this arrangement causes a double image to be easily seen on the upper side in the vertical direction in the display region. The head-up display device performs the blurring processing to the design image in the second divided region on the upper side in the vertical direction, where a double image is easily seen. This enables the head-up display device to prevent visibility as a double image. Furthermore, the head-up display device can display information that does not require high visibility, such as figures, in the second divided region, where the blurring processing is performed. With this, the head-up display device can perform display in accordance with visibility of information while preventing a double image and can thus properly display the virtual image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device comprising:
a display unit disposed in a vehicle and configured to reflect display light reflected off a reflecting member toward an eye point side to display a virtual image in a display region on the reflecting member, the display light being emitted toward the reflecting member, the reflecting member being capable of transmitting light;
a housing equipped with the display unit and including an opening disposed facing the reflecting member, the housing being configured to allow the display light to pass through the opening, the display light traveling from the display unit to the reflecting member;
a transparent cover configured to close the opening and to transmit the display light traveling to the reflecting member; and
a display controller configured to control the display unit, wherein
the display unit includes a display device accommodated inside the housing and configured to be controlled by the display controller to emit the display light,
the transparent cover is arranged at the opening in such a manner that, as the display light emitted by the display device and incident on the transparent cover is closer to the eye point, an incident angle of the display light incident on the transparent cover is greater,
the display region is divided into a first divided region and a second divided region differing from the first divided region, the second divided region being disposed above the first divided region in a vertical direction, and
when displaying a design image displayed by the display light in the second divided region by controlling the display device, the display controller is configured to perform blurring processing of displaying at least an upper side of the design image in the vertical direction in a blurred manner.

2. The head-up display device according to claim 1, wherein
when performing the blurring processing, the display controller is configured to increase a proportion of a blurred region in the design image displayed on an upper side in the vertical direction in the second divided region in comparison to a proportion of a blurred region in the design image displayed on a lower side in the vertical direction in the second divided region.

3. The head-up display device according to claim 2, wherein
when performing the blurring processing, the display controller is configured to increase a blurred region for an upper region of the design image in the vertical direction in comparison to a lower region in the vertical direction.

4. The head-up display device according to claim 2, wherein
when performing the blurring processing, the display controller is configured to form a blurred region on a contour of the design image.

5. The head-up display device according to claim 2, wherein when displaying the design image in the first divided region, the display controller is configured to display the design image in a superimposed manner without causing the design image to follow an object in front of the vehicle contained in the first divided region, and, when displaying the design image in the second divided region, the display controller is configured to display the design image on an object in front of the vehicle contained in the second divided region in a superimposed manner while causing the design image to follow the object.

6. The head-up display device according to claim 2, wherein when displaying the design image in the first divided region by controlling the display device, the display controller is configured not to perform the blurring processing.

7. The head-up display device according to claim 1, wherein when performing the blurring processing, the display controller is configured to increase a blurred region for an upper region of the design image in the vertical direction in comparison to a lower region in the vertical direction.

8. The head-up display device according to claim 1, wherein when performing the blurring processing, the display controller is configured to form a blurred region on a contour of the design image.

9. The head-up display device according to claim 1, wherein when displaying the design image in the first divided region, the display controller is configured to display the design image in a superimposed manner without causing the design image to follow an object in front of the vehicle contained in the first divided region, and, when displaying the design image in the second divided region, the display controller is configured to display the design image on an object in front of the vehicle contained in the second divided region in a superimposed manner while causing the design image to follow the object.

10. The head-up display device according to claim 1, wherein when displaying the design image in the first divided region by controlling the display device, the display controller is configured not to perform the blurring processing.

* * * * *